United States Patent
Terpsma et al.

(10) Patent No.: US 8,960,704 B2
(45) Date of Patent: Feb. 24, 2015

(54) FIFTH WHEEL HITCH KINGPIN ASSEMBLY

(71) Applicant: SAF-HOLLAND, Inc., Holland, MI (US)

(72) Inventors: Eric Terpsma, Holland, MI (US); Richard Polanic, Hudsonville, MI (US); Gerald Hungerink, Holland, MI (US); Richard Sibley, Jr., Grand Haven, MI (US)

(73) Assignee: SAF-HOLLAND, Inc., Holland, MI (US)

( * ) Notice: Subject to any disclaimer, the term of this patent is extended or adjusted under 35 U.S.C. 154(b) by 0 days.

(21) Appl. No.: 13/893,971

(22) Filed: May 14, 2013

(65) Prior Publication Data

US 2014/0339789 A1 Nov. 20, 2014

(51) Int. Cl.
*B62D 53/06* (2006.01)
*B60D 1/01* (2006.01)

(52) U.S. Cl.
CPC ..................................... *B60D 1/015* (2013.01)
USPC .................. 280/433; 280/434; 280/407.1

(58) Field of Classification Search
USPC ....................................... 280/433, 434, 407.1
See application file for complete search history.

(56) References Cited

U.S. PATENT DOCUMENTS

| | | | |
|---|---|---|---|
| 2,838,324 A | 6/1958 | Dalton | |
| 2,907,582 A | 10/1959 | Bourke | |
| 2,958,541 A | 11/1960 | Bär | |
| 3,362,731 A * | 1/1968 | Gasche et al. | ............... 285/212 |
| 3,520,557 A | 7/1970 | Kamman et al. | |
| 3,600,005 A | 8/1971 | Glaza | |
| 3,771,816 A * | 11/1973 | Hord, Jr. | ...................... 280/433 |
| 3,807,765 A | 4/1974 | Pokornicki | |
| 3,807,766 A | 4/1974 | Pleier et al. | |
| 3,811,708 A | 5/1974 | Baaso | |
| 3,887,251 A | 6/1975 | McKay | |
| 4,254,967 A | 3/1981 | Scanlon | |
| 5,411,281 A | 5/1995 | Poirier | |
| 6,073,952 A | 6/2000 | Schulz | |
| 6,220,617 B1 | 4/2001 | Hunger | |
| 6,322,093 B1 | 11/2001 | Athans et al. | |
| 6,565,109 B1 | 5/2003 | Kloepfer | |
| 6,773,023 B2 | 8/2004 | Athans et al. | |
| 6,877,757 B2 | 4/2005 | Hayworth | |
| 7,766,361 B2 | 8/2010 | Hungerink et al. | |
| 2001/0028160 A1 | 10/2001 | Athans et al. | |
| 2002/0190497 A1 | 12/2002 | Metternich | |

FOREIGN PATENT DOCUMENTS

GB 2128952 10/1982

* cited by examiner

*Primary Examiner* — Kevin Hurley
*Assistant Examiner* — Michael Stabley
(74) *Attorney, Agent, or Firm* — Price Heneveld LLP

(57) ABSTRACT

A kingpin assembly comprises a housing having a recess located therein, a kingpin having at least a portion located within the recess of the housing, a collar member operably coupled to the kingpin, and a collet member extending about the kingpin and frictionally engaging the housing and the kingpin.

18 Claims, 2 Drawing Sheets

FIFTH WHEEL HITCH KINGPIN ASSEMBLY

BACKGROUND OF THE INVENTION

The present invention relates to a kingpin assembly for use within a fifth wheel hitch assembly, and particularly to a kingpin assembly that includes a locking collet to prevent rotation of the kingpin with respect to an associated housing.

SUMMARY OF THE INVENTION

One aspect of the present invention is to provide a kingpin assembly that comprises a housing having a recess located therein, a kingpin having at least a portion located within the recess of the housing, a collar member operably coupled to the kingpin, and a collet member extending about the kingpin and frictionally engaging the housing of the kingpin.

The present inventive kingpin assembly prevents rotation of the kingpin with respect to the associated housing while simultaneously allowing easy access to and replacement of an associated kingpin subsequent to wear thereof. Further, the present inventive assembly is more durable, allows replacement of certain components thereof by even unskilled personnel, is extremely efficient in use, capable of a long operating life, and particularly well adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
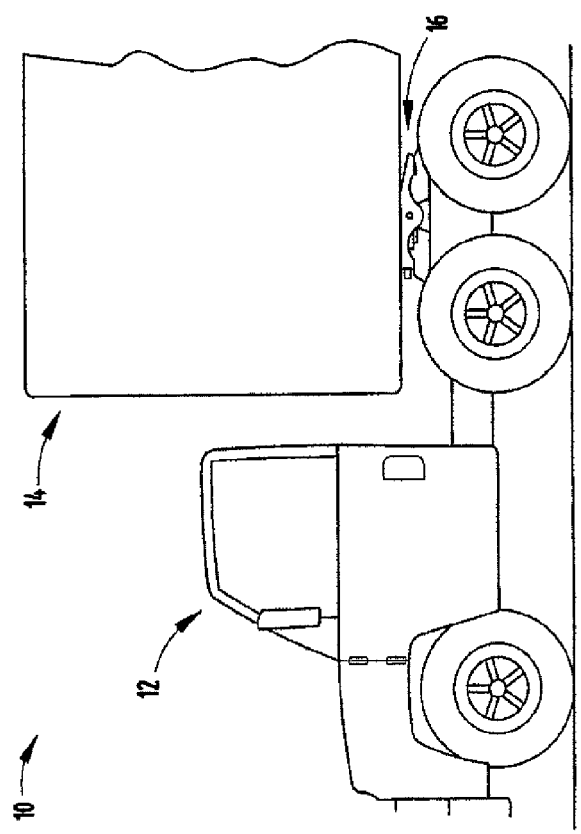
FIG. 1 is a side elevational view of a tractor and heavy duty trailer supported thereby.
Figure 3:
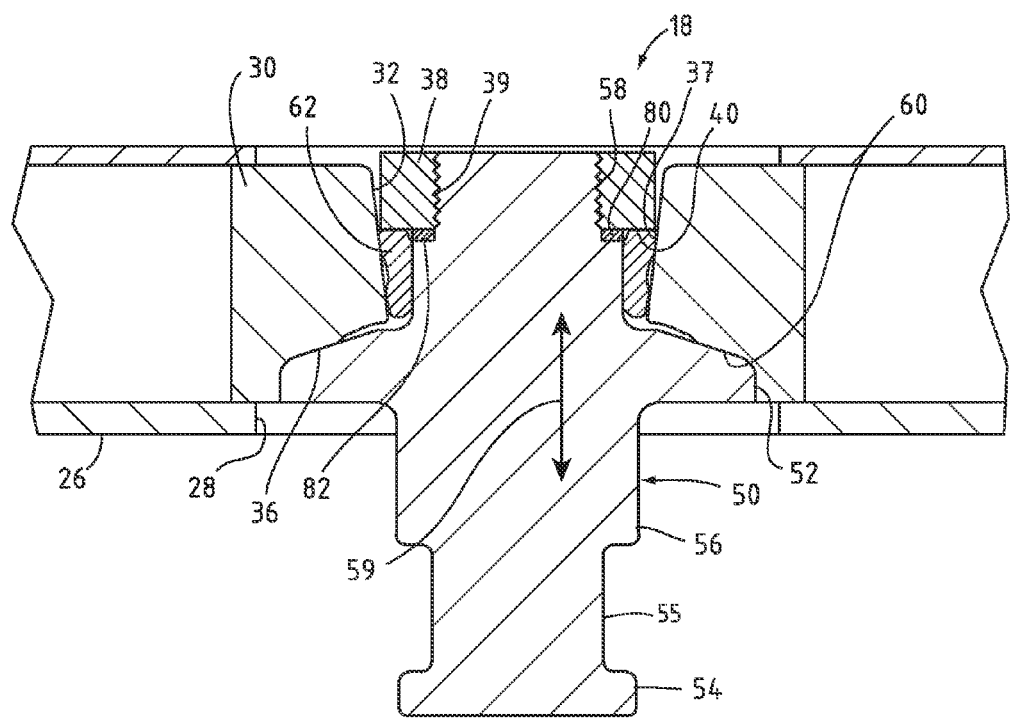
FIG. 3 is a cross-sectional side view of the kingpin assembly taken through the line III-III, FIG. 2.

For purposes of description herein, the terms "upper," "lower," "right," "left," "rear," "front," "vertical," "horizontal," and derivatives thereof shall relate to the invention as oriented in FIGS. 1, 3, and the like. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
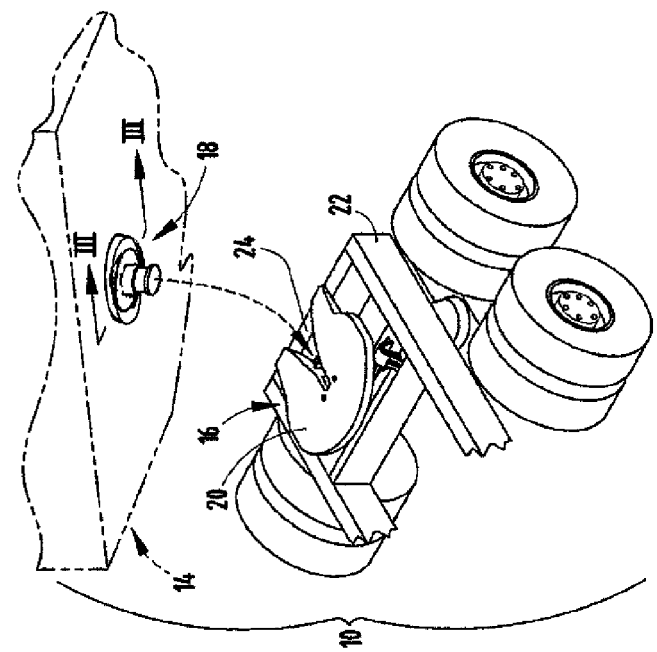
FIG. 2 is a perspective view of a fifth wheel hitch assembly and kingpin assembly of the present invention.

The reference numeral 10 (FIG. 1) generally designates a heavy duty tractor and trailer combination, wherein a tractor 12 operationally supports an associated trailer 14 via a fifth wheel hitch assembly 16 (FIG. 2) and a kingpin assembly 18 cooperating therewith and generally embodying the present invention. In the illustrated example, the fifth wheel hitch assembly 16 includes a fifth wheel hitch plate 20 pivotally coupled to a frame 22 of the associated tractor 12 and including a tapered kingpin-receiving throat 24 and a locking assembly (not shown) as well known in the art.

The kingpin assembly 18 (FIG. 3) is adapted for use within a trailer skid plate 26 mounted to an underside of the associated trailer 14. The trailer skid plate 26 includes an aperture 28 extending therethrough and that cooperates with the kingpin assembly 18 therein. The kingpin assembly 18 includes a housing 30 having a recess in the form of a centrally-located aperture 32 extending therethrough. The aperture 32 further includes a downwardly-opening, conically-shaped step wall 36, and an upwardly-opening, conically-shaped engagement wall 37. The kingpin assembly 18 further includes a ring-shaped collar member 38 including a centrally-located threaded aperture 39 and an abutment surface 40.

The kingpin assembly 18 further comprises a kingpin 50 that includes an upper head portion 52, a lower head portion 54, a recessed lock-receiving portion 55 positioned between the upper head portion 52 and lower head portion 54, a body portion 56, and a threaded upper portion 58 that is threadably received within the aperture 39 of the collar member 38, such that threadably tightening and loosening the collar member 38 with the kingpin 50 secures the kingpin 50 with respect to the housing 30 in the vertical direction 59. The upper head portion 52 of the kingpin 50 includes a conically-shaped abutment surface 60 that abuts the step wall 36 of the housing 30.

Figure 4:
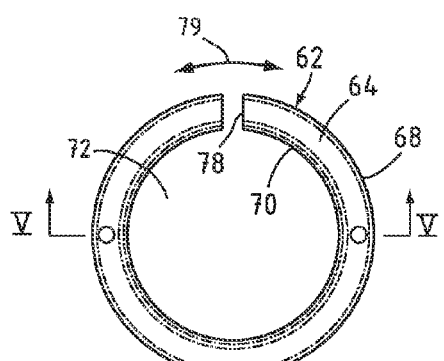
FIG. 4 is a top plan view of a collet member of the kingpin assembly.
Figure 5A:
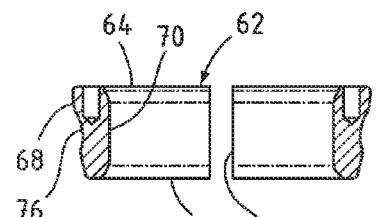
FIG. 5a is a cross-sectional side view of a first embodiment of the collet member taken through the line V-V, FIG. 4.

The kingpin assembly 18 further includes a collet member 62 positioned between the housing 30 and the kingpin 50. The collet member 62 (FIGS. 3-4) is ring-shaped and includes a top surface 64, a rounded bottom surface 66, a tapered, conically-shaped outer wall 68 and a cylindrically-shaped inner wall 70 that defines an aperture 72 within which the kingpin 50 is received. In the illustrated example, the outer wall 68 includes a circumferentially-extending relief 76. As best illustrated in FIG. 5a, a relief 78 extends through the collet member 62, thereby allowing the collet member 62 to expand and contract in a direction 79 as described below.

Figure 5B:
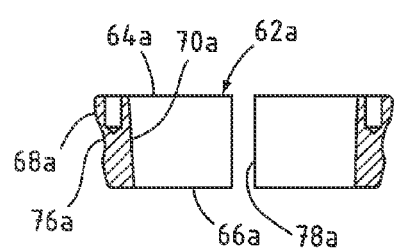
FIG. 5b is a cross-sectional side view of a second embodiment of the collet member.

The reference numeral 62a generally designates a second embodiment of the collet member. Since the collet member 62a is similar to the previously described collet member 62, similar parts appearing in FIGS. 5A and 5B respectively represented by the same, corresponding reference number, except for the suffix "a" in the numerals of the latter. The collet member 62a is similar to the previously described collet member 62, with the most notable exception being the angled inner wall 70a.

In assembly, the kingpin 50 is placed within the aperture 32 of the housing 30. The collet member 62 is then positioned over the kingpin 50 and located between the housing 30 and the kingpin 50. The collar member 38 is then threadably coupled to the kingpin 50, so that the collar member 38 is tightened onto the kingpin 50, such that the abutment surface 40 of the collar member 38 abuts to top wall 64 of the collet member 62, forcing the outer wall 68 of the collet member 38 into engagement with the inner wall 37 of the aperture 32, which in turn forces the collet member 38 to contract and the inner wall 70 of the collet 62 into engagement with the kingpin 50, thereby increasing the frictional engagement between the housing 30, the collet member 62, and the kingpin 50, and preventing rotation of the kingpin 50 with respect to the housing 30. The tightening of the collar member 38 with the kingpin 50 further draws the upper head portion 52 and the abutment surface 60 of the kingpin 50 into contact with the housing 30. It is noted that a seal member 80 may be positioned between the bottom wall 40 of the collar member 38 and an upwardly-disposed wall 82 of the kingpin 50.

The present inventive kingpin assembly prevents rotation of the kingpin with respect to the associated housing while simultaneously allowing easy access to and replacement of an associated kingpin subsequent to wear thereof. Further, the present inventive assembly is more durable, allows replacement of certain components thereof by even unskilled personnel, is extremely efficient in use, capable of a long operating life, and particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A kingpin assembly, comprising:
a housing having a recess located therein;
a kingpin having at least a portion located within the recess of the housing;
a collar member operably coupled to the kingpin; and
a collet member extending about the kingpin and frictionally engaging a radially inwardly-facing surface of the housing and a radially outward-facing surface of the kingpin; and
wherein the collet member is positioned between the kingpin and the collar member.

2. The kingpin assembly of claim 1, wherein the collar member is adjustable with respect to the kingpin such that adjusting the collar with respect to the kingpin increases the frictional engagement between the collet member and at least one of the housing and the kingpin.

3. The kingpin assembly of claim 2, wherein the collar member is threadably adjustable with respect to the kingpin.

4. The kingpin assembly of claim 3, wherein the collar member includes an aperture through which the kingpin extends.

5. The kingpin assembly of claim 4, wherein the kingpin includes a threaded portion that is threadably received within the aperture of the collar member.

6. The kingpin assembly of claim 5, wherein the recess of the housing includes a tapered inner wall, and wherein the collet member engages the tapered inner wall.

7. The kingpin assembly of claim 6, wherein the collet member includes a tapered outer wall that engages the tapered inner wall of the housing.

8. The kingpin assembly of claim 7, wherein the collet member is ring-shaped.

9. The kingpin assembly of claim 8, wherein the collet member includes a slot positioned about the periphery thereof.

10. The kingpin assembly of claim 9, wherein the kingpin is a single, integral piece.

11. The kingpin assembly of claim 10, wherein the housing and the kingpin each include conically-shaped surfaces that abut one another.

12. The kingpin assembly of claim 1, wherein the collar member is adjustable with respect to the kingpin such that adjusting the collar with respect to the kingpin increases the frictional engagement between the collet member and at least one of the housing and the kingpin.

13. A kingpin assembly of claim 1, wherein the collar member is threadably adjustable with respect to the kingpin.

14. The kingpin assembly of claim wherein 1, the collet member is ring-shaped.

15. The kingpin assembly of claim 1, wherein the collet member includes a tapered inner wall.

16. The kingpin assembly of claim 1, wherein the collet member is a single, integral piece.

17. A kingpin assembly, comprising:
a housing having a recess located therein;
a kingpin having at least a portion located within the recess of the housing;
a collar member operably coupled to the kingpin; and
a collet member extending about the kingpin and frictionally engaging a radially inwardly-facing surface of the housing and a radially outwardly-facing surface of the kingpin;
wherein the collar member includes an aperture through which the kingpin extends;
wherein the kingpin includes a threaded portion that is threadably received within the aperture of the collar member.

18. A kingpin assembly, comprising:
a housing having a recess located therein;
a kingpin having at least a portion located within the recess of the housing;
a collar member operably coupled to the kingpin; and
a collet member extending about the kingpin and frictionally engaging a radially inwardly-facing surface of the housing and a radially outwardly-facing surface of the kingpin;
wherein the recess of the housing includes a tapered inner wall, and wherein the collet member engages the tapered inner wall;
wherein the collet member includes a tapered outer wall that engages the tapered inner wall of the housing.

\* \* \* \* \*